United States Patent Office 3,449,070
Patented June 10, 1969

3,449,070
STABILIZED ZEOLITES
Carl Vance McDaniel, Laurel, and Philip Kenerick Maher, Baltimore, Md., assignors to W. R. Grace & Co., New York, N.Y., a corporation of Connecticut
No Drawing. Continuation-in-part of applications Ser. No. 353,288, Mar. 19, 1964, and Ser. No. 611,256, Jan. 24, 1967. This application Dec. 20, 1967, Ser. No. 691,983
The portion of the term of the patent subsequent to Dec. 20, 1983, has been disclaimed
Int. Cl. C01b *33/28;* B01j *11/40*
U.S. Cl. 23—111            18 Claims

ABSTRACT OF THE DISCLOSURE

Processes for producing stabilized faujasite zeolites having a silica to alumina mole ratio of about 3.5 to 7 and having an alkali metal content, expressed as the oxide, of either less than one percent by weight or from greater than 1% to 4% by weight and also the latter as a composition of matter. The composition of matter has particular utility in the preparation of and as cracking catalysts. The process is characterized by the ion exchange removal and replacement of the major portion of the alkali metal cation content of the zeolite with hydrogen ions or ions, such as for example, ammonium ions, which are convertible to hydrogen ions. Further, this process does not require the use of stabilizing ions, such as the cations of rare earth metals, in the ion exchange solutions nor any metal cations other than hydrogen ions or ions which are convertible to hydrogen ions and also in the use of a single calcination step—which stabilizes the zeolite. The stabilizing calcination step is effected at temperatures of from 1300 to 1900° F. where the sodium content, expressed as the oxide is less than 1% by weight, and where the sodium content, expressed as the oxide, is from 1% to 4% by weight, the minimum calcination temperature used is determined as a function of sodium content according to the equation:

$$T = 1238 + 60A$$

wherein
T = calcination temperature,
A = weight percent alkali metal content expressed as the chemical equivalent weight of $Na_2O$.

CROSS-REFERENCE TO RELATED APPLICATIONS

This application is a continuation-in-part of application Ser. No. 353,288, filed Mar. 19, 1964, and application Ser. No. 611,256, filed Jan. 24, 1967, which is a continuation-in-part of Ser. No. 396,754, filed Sept. 15, 1964, which is a continuation-in-part of Ser. No. 318,249, filed Oct. 23, 1963, and Ser. No. 260,298, filed Feb. 21, 1963, all of which are now abandoned.

BACKGROUND OF THE INVENTION

Field of the invention

This invention relates to stabilized crystalline zeolites having an alkali metal content, expressed as the chemical equivalent weight of sodium oxide, of from 1 to 4 weight percent and to methods of producing this material and also methods of producing stabilized crystalline zeolites having an alkali metal content expressed as the oxide of less than 1% by weight.

Throughout this specification and in the claims, the terms "weight percent of alkali metal" or "sodium" will be referred to. In every case, this is based on, as is well recognized by the art, the weight of oxide of the metal, e.g., $Na_2O$, and where alkali metal is used, this is based on the weight of a chemically equivalent weight of $Na_2O$. Thus conversion to the actual weight percent ranges for a particular alkali metal may be accomplished by multiplying the weight percent given by the molecular weight of the particular alkali metal oxide divided by the molecular weight of sodium oxide (e.g., for potassium, weight percent times M.W. $K_2O$/M.W. $Na_2O$). And conversely to obtain the proper minimum stabilization temperature for a given alkali metal oxide content, A is determined by multiplying the alkali metal oxide weight percent by the ratio of the molecular weight of $Na_2O$ divided by the molecular weight of the oxide of that particular alkali metal oxide.

The Prior Art

The crystalline faujasite zeolites, frequently called molecular sieves, with which this invention is primarily concerned are crystalline metal aluminosilicates having a three dimensional structure of silica-alumina tetrahedra. The zeolite structure is characterized by a repeating three dimensional network of large open aluminosilicate cages interconnected with small uniform openings or pores. Certain of these microselective adsorbents have been prepared synthetically from sodium silicate and sodium aluminate. After synthesis, these large cavities are filled with water which can be driven off by heating without collapsing the cage. When dehydrated, these cavities can readsorb large quantities of water and other vapors at low partial pressures. Due to the uniform structures or pore openings connecting the aluminosilicate cavities, these zeolites exhibit the unique property of excluding large molecules from the cavity and allowing smaller molecules to pass through and be adsorbed, thereby acting as microselective adsorbents for molecules according to their size and shape.

There is presently a considerable interest in the use of molecular sieve materials as promoters in petroleum cracking catalysts. These catalysts have very desirable cracking properties in that they have an excellent cracking activity and gas producing and carbon producing factors within desirable ranges and further the products recovered are those most desired in refinery operations.

However, one of the principal problems encountered in incorporating these microselective adsorbents into the silica-alumina fluid cracking catalyst is their general lack of structural stability. This is very important because the regeneration cycle of a fluid cracking catalyst requires that a catalyst be able to withstand steam and/or thermal atmospheres in the range of 1300–1700° F. When fluid cracking catalysts are regenerated, the temperature of the catalyst frequently reaches a high level. Any catalytic system that cannot withstand such temperatures loses its catalytic acitivity on regeneration, and its usefulness is greatly impaired.

In the preparation of both zeolite promoted and also unpromoted silica-alumina fluid cracking catalysts by conventional techniques, elaborate methods are prescribed and followed to remove the sodium from the cracking catalyst. In the preparation of synthetic 13% "active" alumina and 25% "active" alumina cracking catalysts, the level of sodium in the final product is reduced to a minimum. This is necessary because the presence of sodium in these catalysts is one of the principal causes of the lack of structural stability at high temperatures. Further, since most zeolites are prepared or occur naturally in the alkali metal or mixed alkali metal-alkaline earth form, the removal of the alkali metals becomes a very important part of the process of preparing the final process. In the application of these materials in cracking catalysts, the zeolite will comprise about 2 to 90% of the resulting composite catalysts with the preferred range being about 5 to 25%.

A unique zeolite composition which is ultrastable to high temperature and is very attractive as an additive for fluid cracking catalyst has been disclosed previously. This zeolite is ultrastable to high temperature, thermal and steam treatment and is characterized by the fact that it contains less than 1% by weight alkali metal, expressed as the oxide. Another distinguishing feature of the unique zeolite composition of our invention is the unit cell size. This unit cell size is achieved by the unique stabilization step and the absence of cations. The basic formula for this crystalline zeolite may be represented as follows:

$$xM_{2/n}O \cdot Al_2O_3 \cdot 3.5-7SiO_2 \cdot yH_2O$$

where M represents H+ or any other cation except the alkalis and $n$ is its valence, where $y$ can vary from 0 to 9, and $x$ from 0 to 1. The ultrastable zeolite can contain varying amounts of cations, other than the alkali metals or be cation-free. One particularly significant value of the previously disclosed product is the ultrahigh stability attained by elimination of the alkali metal ion and the resulting unit cell shrinkage during the stabilization step. The unique product is identified by its stability, the smaller unit cell and the lack of alkali metal in the crystal structure. The unit cell of our product is in the range of 24.20 to 24.45 A.

The general procedure for making this ultrastable zeolite involves removing a portion of the alkali metal ions from a corresponding zeolite having an alkali metal oxide content of greater than 1% and up to about 4% by weight with a solution of a salt of a nitrogen base calcining and then further exchanging the zeolite down to an alkali metal content below 1% by weight and then calcining the material at a temperature in the range of from 1300 to 1900° F.

However, it has been found that known zeolite materials in the dry state which seemed to have the desired structure and alkali metal concentration requisite for use in making the ultrastable zeolites were unsatisfactory. For example, the 80 mole percent ammonium exchanged type Y molecular sieve zeolite disclosed in Patent No. 3,130,006, which had an alkali metal content expressed as the oxide of about 2.3 weight percent and had been calcined at 538° C. or 600° C. gave erratic results. When the calcined material had been stored for several days before further sodium ion removal, the product produced was completely unstable at elevated temperatures.

OBJECTIVES AND SUMMARY OF THE INVENTION

It is, therefore, an object of this invention to provide a new zeolitic composition which can be used to make an ultrastable Z–14US zeolite even after storage for an extended period of time and to provide a method for making this composition.

It is a further object of this invention to provide new processes for making the stable Z–14US zeolite described in our previous application Ser. No. 318,249, filed Oct. 23, 1963.

Other objects and a fuller understanding of our invention may be had by referring to the following description and claims.

In summary, the composition of this invention is a stabilized synthetic aluminosilicate having the composition expressed as mole ratios of oxides:

$$(xR_2O:yM_{2/n}O):Al_2O_3:3.5-7SiO_2:zH_2O$$

where R is an alkali metal, $x$ is from about 0.1 to 0.3, M is H+ and $n$ is its valence, $y$ is within the range of from about 0 to 0.9, and $z$ is within the range of from about 0 to 9; having a unit cell size of from 24.40 to 24.55 A; and having a stable structure as indicated by retention of a surface area greater than 150 m.²/g. as measured by the ammonium exchange test. In terms of weight percent, the zeolite has an alkali metal content expressed as the chemical equivalent weight of sodium oxide of from greater than 1% to 4% by weight.

In summary, the process of our invention of preparing the above synthetic stabilized zeolite comprises successively base exchanging a crystalline aluminosilicate with a solution containing hydrogen ions or ions capable of being converted to hydrogen ions until the alkali metal content of the aluminosilicate is reduced to within the range of from greater than 1 and up to about 4 weight percent and heating said exchanged zeolite to a temperature insufficient to destroy the crystal structure of the zeolite but at least T as expressed by the equation $$T = 1238 + 60A$$

where T is the calcination temperature, ° F., and A is the alkali metal weight percent content expressed as the chemical equivalent weight of the oxide of sodium, the crystalline faujasite initially having the approximate formula in terms of oxides as follows:

$$R_2O:Al_2O_3:3.5-7SiO_2:yH_2O$$

where M is an alkali metal, and $y$ can be from 0 to 9.

In summary, one process of our invention of preparing a Z–14US faujasite zeolite having an alkali metal content, expressed as the oxide, of less than 1% comprises ion exchanging a suitable crystalline faujasite zeolite starting material with a solution containing hydrogen ions, or cations which can be converted to hydrogen ions (e.g., ammonium ions, amine ions and the like), to decrease the alkali metal content to from greater than 1% by weight to 4% by weight. The product of this exchange is then calcined at or above a minimum temperature which is a function of the alkali metal content as set forth above, and below the effective crystalline collapse temperature of the product. Thus, this in effect results in the inventive composition of our invention. This composition is then further exchanged to substantially remove the balance of the alkali metals present to leave a product having an alkali metal content, expressed as the oxide, of less than 1% by weight.

In summary, in a second process of our invention for producing a Z–14US stabilized zeolite having an alkali metal content, expressed as the oxide, of below 1% by weight, a suitable zeolite starting material is base exchanged with a concentrated solution of the ammonium salt, amine salt, etc. or other material which on heating decomposes and leaves the zeolite in the hydrogen form. This exchange is continued until the alkali metal content is reduced to less than 1%. The product is filtered, washed and calcined at 1300 to 1900° F.

These two processes are notably distinguished from the processes claimed in our application Ser. No. 481,669, filed Aug. 23, 1965, now U.S. Patent No. 3,293,192, in that only a single calcination step is required.

DESCRIPTION OF PREFERRED EMBODIMENTS

The first step in our process of preparing the composition of our invention is the selection of a suitable zeolite. Our novel product can be prepared from certain of the natural and synthetic zeolites, such as the natural and synthetic faujasites. A particularly suitable raw material is the synthetic faujasite designated as Z–14HS and described in application Ser. No. 131,734, filed Aug. 16, 1961, and now abandoned.

The method of preparing this particular zeolitic raw material is not part of this invention. Briefly, the method described in the above application comprises the steps of preparing a silica-alumina-sodium oxide-water slurry wherein the mole ratios of sodium oxide to silica are from 0.2 to 0.8, the silica to alumina mole ratio 10 to 30 and water to sodium oxide mole ratio 20 to 60. A reactive particulate form of silica is essential in preparing these compounds.

The silica-alumina-sodium oxide-water slurry containing a reactive particulate form of silica is equilibrated or digested at room temperature or moderate temperature for a period of at least 3 hours. At the end of this aging period, the resulting mixture is heated at an elevated temperature until the synthetic zeolite crystallizes. The synthetic zeolite product is then separated and recovered. The desired product is crystallized relatively free from other zeolites.

The next step of our process is the base exchange of the zeolite with a solution containing hydrogen ions or cations which can be converted to hydrogen ions, i.e., cations which decompose when heated to leave an appreciable portion of the zeolite in the hydrogen form. A particularly notable aspect of our invention is that we are able to produce a thermally stable product without the use of stabilizing cations, such as for example, rare earth metal cations, in the ion exchange solution.

A wide variety of acidic compounds can be employed with facility as a source of hydrogen ions and include both inorganic and organic acids.

Representative inorganic acids which can be employed include acids such as hydrochloric acid, hypochlorous acid, chloroplatinic acid, sulfuric acid, sulfurous acid, hydrosulfuric acid, peroxydisulfonic acid ($H_2S_2O_3$), peroxymonosulfuric acid ($H_2SO_5$), dithionic acid $$(H_2S_2O_6)$$

sulfamic acid ($H_2NHS_3H$), amidodisulfonic acid $$(NH(SO_3H)_2)$$

chlorosulfuric acid, thiocyanic acid, hyposulfurous acid ($H_2S_2O_4$), pyrosulfuric acid ($H_2S_2O_7$), thiosulfuric acid ($H_2S_2O_3$), nitrosulfonic acid ($HSO_2 \cdot NO$), hydroxylamine disulfonic acid (($HSO_3)_2NOH$), nitric acid, nitrous acid, hyponitrous acid, carbonic acid and the like.

Typical organic acids which find utility in the practice of the invention include the monocarboxylic, dicarboxylic and polycarboxylic acids which can be aliphatic, aromatic or cycloaliphatic in nature.

Representative aliphatic monocarboxylic, cicarboxylic and polycarboxylic acids include the saturated and unsaturated substituted and unsubstituted acids such as formic acid, acetic acid, chloroacetic acid, dichloroacetic acid, trichloroacetic acids, bromoacetic acid, propionic acid, 2-bromopropionic acid, 3-bromopropionic acid, lactic acid, n-butyric acid, and isobutyric acid, crotonic acid, n-valeric acid, isovaleric acid, n-caproic acid, oenanthic acid, pelargonic acid, capric acid, undecylic acid, lauric acid, myristic acid, palmitic acid, stearic acid, oxalic acid, malonic acid, succinic acid, glutaric acid, adipic acid, pimelic acid, suberic acid, azelaic acid, sebacic acid, alkylsuccinic acid, alkenylsuccinic acid, malei acid, fumaric acid, itaconic acid, citraconic acid, mesaconic acid, glutonic acid, muconic acid, ethylidene malonic acid, isopropylidene malonic acid, and allyl malonic acid.

Representative aromatic and cylcoaliphatic monocarboxylic, dicarboxylic and polycarboxylic acids include 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, 1,8-naphthalenedicarboxylic acid, 1,2-naphthalenedicarboxylic acid, tetrahydrophthalic acid, 3-carboxycinnamic acid, hydrocinnamic acid, pyrogallic acid, benzoic acid, ortho-, meta- and para-methyl, hydroxy, chloro, bromo and nitro-substituted benzoic acids, phenylacetic acid, mandeloric acid, benzylic acid, hippuric acid, benzenesulfonic acid, toluenesulfonic acid, methanesulfonic acid and the like.

Other sources of hydrogen ions include carboxy polyesters prepared by the reaction of an excess polycarboxylic acid or an anhydride thereof and a polyhydric alcohol to provide pendant carboxyl groups.

Still other materials capable of providing hydrogen ions are ion exchange resins having exchangeable hydrogen ions attached to base resins comprising cross-linked resinous polymers of monovinyl aromatic monomers and polyvinyl compounds. These resins are well-known materials which are generally prepared by copolymerizing, in the presence of a polymerization catalyst, one or more monovinyl aromatic compounds, such as styrene, vinyl toluene, vinyl xylene, with one or more divinyl aromatic compounds such as divinyl benzene, divinyl toluene, divinyl xylene, divinyl naphthalene and divinyl acetylene, Following copolymerization, the resins are further treated with suitable acids to provide the hydrogen form of the resin.

Still another class of compounds which can be employed are compounds which decompose to provide hydrogen ions when an aluminosilicate after treatment with a solution of said compound is subjected to temperatures below the decomposition temperature of the aluminosilicate. We have found it preferable to use one of these compounds rather than an acid, since in using an acid particular care must be taken to ensure that the concentration (pH) of the acid be controlled such that it does not attack the zeolite structure. For example, if the pH drops below 4 in any localized area, the zeolites in that area will be destroyed.

Representative ammonium compounds which can be employed in this respect include ammonium chloride, ammonium bromide, ammonium iodide, ammonium carbonate, ammonium bicarbonate, ammonium sulfate, ammonium sulfide, ammonium thiocyanate, ammonium dithiocarbamate, ammonium peroxysulfate, ammonium acetate, ammonium tungstate, ammonium hydroxide, ammonium molybdate, ammonium sesquicarbonate, ammonium chloroplumbate, ammonium citrate, ammonium dithionate, ammonium fluoride, ammonium gallate, ammonium nitrate, ammonium nitrite, ammonium formate, ammonium propionate, ammonium butyrate, ammonium valerate, ammonium lactate, ammonium malonate, ammonium oxalate, ammonium palmitate, ammonium tartrate and the like. Still other ammonium compounds which can be employed include tetraalkyl and tetraaryl ammonium salts such as tetramethylammonium hydroxide, trimethylammonium hydroxide. Other compounds which can be employed are nitrogen bases such as the salts of guanidine, pyridine, quinoline, etc.

The preferred compounds are the ammonium compounds including ammonium salts, such as ammonium chloride, ammonium sulfate, and ammonium nitrate, and ammonium hydroxide.

The cation exchange is carried out rapidly with an excess of salt solution. The salt may be present in an excess of about 5 to 600%, preferably about 20 to 300%. The exchange is carried out rapidly at 100° C. However, temperatures in the range of 25 to 150° C. give satisfactory results. The exchange is generally completed in a period of about 0.1 to 24 hours. This exchange can comprise either single or multiple-step treatments. This preliminary exchange reduces the alkali metal content of the zeolite. Chemical analysis of the product at this stage shows that the product contains greater than 1 and up to about 4 percent by weight of alkali metal. It is preferred that the $Na_2O$ content of the product at this stage contain from about 1.5 to 2.9 weight percent alkali metal oxide.

After the preliminary exchange is completed, the zeolite is usually filtered and washed. The zeolite is then heated to a temperature of at least T as expressed by the equation $$T = 1238 + 60A$$

wherein T is the calcination temperature, ° F., and A is the alkali metal oxide content of the base exchange zeolite expressed as the chemical equivalent weight of the oxide of sodium. The calcination temperature must be insufficient to destroy the crystal structure of the zeolite. For example at an alkali metal content of around one percent, the zeolite is calcined to a temperature of at least 1298° F. and at an alkali metal content of around 4%, the zeolite is calcined to a temperature of at least 1478° F. The maximum preferred calcination temperature is around 1600° F. as above this temperature it becomes difficult to heat the zeolite without destroying the crystalline structure. Heating at these temperatures for times greater than 0.1 minute is suitable. The heating time can be up to 12 hours and longer, but lengthy heating provides no added benefits.

It is important when forming the product of this invention from exchanged, dried material, to calcine the zeolite within 24 hours and for best results within about 8 hours after it has been dried. If the calcination after drying is unduly delayed, the product may be unsuitable for producing ultrastable zeolite material. This becomes especially critical as the alkali metal content is reduced.

Considering now the embodiment of our invention wherein we provide two processes for preparing a Z–14US type zeolite, such as described in our prior application Ser. No. 481,669 (U.S. Patent No. 3,293,192), having an alkali metal content, expressed as the oxide of less than 1% by weight. The first step in each of these processes is the selection of a suitable zeolite. This is done in the same manner and applying the same criterion as was set forth above with respect to the process embodiment of preparing our novel composition.

The next step of this process is the base exchange of the zeolite with an ammonium salt, amine salt or other salt which on calcination decomposes and leaves an appreciable portion of the zeolite in the hydrogen form. Examples of suitable compounds of this type include ammonium chloride, ammonium sulfate, tetraethyl ammonium chloride, tetraethyl ammonium sulfate, etc. Ammonium salts, because of their ready availability and low cost, are the preferred reagents of this step of the reaction. This exchange is carried out rapidly with an excess of salt solution. The salt may be present in an excess of about 5 to 600%, preferably about 20 to 300%. The exchange is carried out rapidly at 100° C. However, temperatures in the range of 25 to 150° C. give satisfactory results. The exchange is generally completed in a period of about 0.1 to 24 hours. This preliminary exchange reduces the alkali metal content of the zeolite. A chemical analysis of the product at this stage shows that the product contains greater than 1% by weight and usually 1.5% to 4% by weight alkali metal. It is preferred that the $Na_2O$ content of the product at this stage contain no more than 2.5 to 4.0 weight percent alkali metal oxide.

In the next step of the process, the product is filtered, washed, dried and calcined at a temperature insufficient to destroy the crystal structure of the zeolite, e.g., normally below 1600° F., but at least T as expressed by the equation $$T = 1238 + 60A$$

where T is the calcination temperature, °F., and A is the alkali metal content, expressed as the oxide, weight percent; and where alkali oxides are other than $Na_2O$ then, of course, the weight percent is reduced to a chemically equivalent weight of $Na_2O$. As should be apparent from the aforegoing discussion, the product produced at this stage of our process is equivalent to our novel composition and indeed our novel composition could be used as a starting material at this point.

In the next step of the process, the zeolite is treated with a solution of ammonium salt or amine salt, etc. Although from a commercial standpoint, the ammonium salts or amine salts are normally the most economically desirable, it may be desired for specialized applications of the zeolite catalyst to replace a portion of the residual alkali metal content with cations of certain metals such as the rare earths. More specifically, the ion exchange at this point may be effected by treating the zeolite with a salt solution of salts of yttrium, rare earth metals, aluminum, platinum and salts of the metals of Groups I–B, II–B, II–A, and VIII of the Periodic Table or mixtures thereof. This exchange should be carried out for a period of 0.1 to 24 hours conveniently for a period of about 1 hour. This exchange can be carried out in any suitable manner, preferably the zeolite is contacted with the ammonium or amine salt solution at a temperature of 25 to 150° C. At the end of this time, the material is again filtered, washed thoroughly to remove all traces of sulfate and dried. It is preferable that the alkali metal oxide content of the product be not more than 0.40 weight percent at this stage of the process. Since the structure of the zeolite has been stabilized by the single calcination, no additional stabilization is required. In order to measure the unique unit cell, the product should be properly dried.

In the alternate process, the synthetic Z–14HS zeolite is prepared as before and the first exchange is carried out with a concentrated solution of ammonium salt, amine salt, etc. This exchange is carried out with a solution at a concentration of 20 to 60 weight percent, preferably about 25 to 50 weight percent. The exchange is carried out for a period of about 0.1 to 3 hours at a temperature of 25 to 150° C. At the end of this exchange, the zeolite contains less than 1% sodium.

After this exchange is complete, the product is filtered, washed thoroughly to remove any traces of sulfate and stabilized by calcination at high temperatures. This calcination must be effected before the zeolite has been allowed to stand in the dried state for any appreciable period of time. Specifically, before the zeolite in the dried state has been allowed to stand 24 hours and preferably before 8 to 10 hours. The calcination is carried out at temperatures of 1300 to 1900° F. for a period of 0.1 to 6 hours, preferably 1400 to 1600° F. for 0.1 to 4 hours. It is preferable that the alkali metal oxide content of the product be no more than 0.40 weight percent prior to this calcination step.

The essence of the processes covered in the instant application reside in a more simplified method of preparing the Z–14US product than has been previously available. In the first method, the sodium oxide content of the zeolite is reduced to less than 4%. The zeolite is subjected to a high temperature calcination which unlocks the alkali metal and stabilizes the structure. As a result of the calcination, the sodium and alkali metal ions can be easily removed with dilute or concentrated salt solution without danger of producing an unstable or metastable product.

This method thus consists of base exchanging the zeolite with an ammonium salt, amine salt or other salt which on calcination decomposes to leave an appreciable portion of the zeolite in the hydrogen form. This exchange is carried out at from 25 to 100° C. with an excess salt solution. The zeolite is filtered, washed and calcined at minimum temperatures, as set forth above, of $$T = 1238 + 60A$$

The preliminary exchange reduces the alkali metal content of the zeolite to 1.5 to 4%, the subsequent calcination causes an internal rearrangement or transfer so that the remaining alkali metal ions are easily removed by a second base exchange with fresh salt solution. The calcination within the temperature range specified results in the stabilization of the structure as shown by the shrinkage of the unit cell and by a drastic increase in thermal stability on removal of the remaining alkali metal ions to less than 1% by the final base exchange step. Thus the zeolite becomes the ultrastable Z–14US zeolite after proper drying. The unique feature of this process is that the stabilization and calcination are performed when the alkali metal content of the zeolite is greater than 1%, and usually 1.5%, to 4% by weight rather than after the alkali metal content has been reduced to below 1%.

The advantage of this process over the process previously disclosed is that it eliminates one calcination step and hence is a more economical process.

In the second method of this embodiment, the alkali metal ions are removed from the faujasite to a low level by means of concentrated solutions of nitrogen base salts, such as ammonium sulfate, ammonium chloride, etc. without an intermediate soda unlocking step. After this exchange, the product is stabilized by heating to 1300 to 1900° F. for a period of 1 to 6 hours. In this process, it is critically important that extreme caution be exercised to assure that the product is not converted to the unstable form during the exchange step.

This process consists of base exchanging the zeolite with a concentrated (25-50% by weight) solution of ammonium salt, amine salt or other salt which on calcination decomposes to leave appreciable portions of the zeolite in the hydrogen form. By means of this very concentrated salt solution, the alkali metal content can be reduced to less than 1%. The zeolite is then filtered, washed and calcined at 1300 to 1900° F. to stabilize the structure. The unique feature of this process is that only one base exchange and one calcination are required in the preparation of the ultrastable Z-14US product.

Our invention will be further illustrated by a number of working examples. The physical properties of the materials which were produced by these examples were determined using the following testing procedure:

The X-ray diffraction measurements of the materials were made with a Norelco X-ray diffractometer with a nickel-filtered CuK radiation. The instrument was operated with a 40 kv. operating potential and a current of 20 ma.

The surface area of these materials were determined by the well-known Brunauer-Emmett-Teller method (S. Brunauer, P. Emmett and E. Teller, J. Am. Chem. Soc. 60, 309 (1938)).

The suitability of these materials for producing an ultrastable composition was determined by the ammonium exchange test, the procedure of which is as follows. The first step of the test consists of taking a crystalline zeolite having an alkali metal content, expressed as the oxide, within the range of greater than 1 and up to about 4 weight percent, and treating the zeolite with ammonium sulfate, and water having the respective weight ratios of 1:3:60. The mixture temperature is maintained at 100° C., and the zeolite is left in the mixture for 3 hours with stirring. The zeolite is then filtered from the mixture and is washed thoroughly, i.e., until sulfate ions cannot be detected in the wash water. The zeolite is then dried at 110° C. for at least 2 hours and is stored as the dried material for at least 24 hours at room temperatures. The zeolite is then heated above 1700° F. for 2 hours, and the surface area of the zeolite is measured. Heating at 1725° F. is a more severe test, but the temperature of 1700° F. is satisfactory and is contemplated in the ammonium exchange test. If the surface area of the heated material is at least 150 m.²/g., it is considered to have passed the test.

It must also be remembered that the following examples are merely illustrative of our invention and are not limiting thereof.

EXAMPLE I

This example shows the process for making the composition of this invention and the product.

The zeolite from which the product of this invention was made was a Z-14HS zeolite having the following basic formula expressed in terms of oxides:

$Na_2O:Al_2O_3:5.1SiO_2:4H_2O$

The material displayed the following principal X-ray diffraction lines.

| $d$ (A.): | $I/I_o$ |
|---|---|
| 14.6 | 100 |
| 8.9 | 34 |
| 7.56 | 22 |
| 5.75 | 40 |
| 4.81 | 12 |
| 4.41 | 20 |
| 3.95 | 10 |
| 3.81 | 48 |
| 3.34 | 46 |
| 3.05 | 11 |
| 2.947 | 19 |
| 2.882 | 44 |
| 2.794 | 18 |
| 2.661 | 18 |

A 20 lb. sample of this material was slurried with 150 lb. of water containing 30 lb. of ammonium sulfate. The slurry was heated at 100° C. for 1 hour with stirring, was filtered, and the exchange was repeated 2 more times. The product was then filtered and washed thoroughly. The product at this point contained 1.86 weight percent $Na_2O$ (dry basis).

A 4.1 lb. (D.B.) portion of the material was then calcined at 1500° F. for 4 hours.

The material was then tested by the ammonium exchange test as follows:

A 4.1 lb. sample of the calcined material was slurried with 250 lb. of water containing 12.5 lb. of ammonium sulfate. The slurry was heated at 100° C. for 3 hours with stirring. The product was then filtered and washed thoroughly. The sodium content of the product was 0.25 weight percent (D.B.). A sample of the product was dried overnight at 110° C. and was then stored at ambient temperatures for 24 hours. The product was then calcined at 1725° F. for 2 hours and the surface area of the product was measured and the results are shown in Table A as Sample No. 1.

EXAMPLE II

This example shows that the composition of this invention has unique properties not found in similar materials which had not been calcined at a temperature according to this invention.

In this example, a sample of Z-14HS zeolite was base exchanged with ammonium sulfate solution as described in Example I. A 30 g. (D.B.) sample of the material was then calcined at a temperature of 400° F. for 2 hours. A second 30 g. (D.B.) sample was heated at 1500° F. for 2 hours.

These materials were then tested by the ammonium exchange test, and the results are shown in Table A as Sample Nos. 2 and 3, respectively.

EXAMPLE III

This example shows that the composition has unique properties not found in type Y zeolites of the type disclosed in Patent No. 3,130,006.

The zeolite tested was an ammonia exchanged type Y zeolite obtained from Union Carbide Corporation. The chemical analysis of the material was as follows.

Chemical analysis, weight percent:
    Total volatiles at 170° F. _____ 62.82
    $SiO_2$ (dry basis) _____ 71.59
    $Al_2O_3$ (dry basis) _____ 23.77
    $Na_2O$ (dry basis) _____ 2.08

A 15 g. portion of this material was calcined at 538° C. in accordance with the disclosure of Patent No. 3,130,006.

This material was then tested by the ammonium exchange test and the results are shown in Table A as Sample No. 4.

11

Table A.—Physical properties after the ammonium exchange test

| Sample No.: | Surface area, m.²/g. |
|---|---|
| 1 | 525 |
| 2 | <10 |
| 3 | 615 |
| 4 | <10 |

The surface area measured in the ammonia exchange-calcination test further illustrates the unique properties of the composition of this invention. Only the materials of Sample Nos. 1 and 3 had a surface area in excess of 150 m.²/g. showing a retention of the crystalline structure at 1725° F.

EXAMPLE IV

The zeolite used in this example was a type Y zeolite having the following analysis.

Chemical analysis, weight percent:

| | |
|---|---|
| T.V. @ 1750° F. | 59.82 |
| Na₂O (D.B.) | 12.89 |
| Al₂O₃ (D.B.) | 19.12 |
| SiO₂ (D.B.) | 67.37 |
| Unit cell size, A. | 24.65 |

The zeolite was ammonium exchanged to a sodium content of about 3% as follows: A 300 g. (D.B.) sample of the zeolite mixed with 4500 g. water containing 900 g. of ammonium sulfate and having a temperature of 100° C. for one hour with stirring. The zeolite was then filtered and mixed with a fresh solution containing 300 g. of ammonium sulfate and 4500 g. of water having a temperature of 100° C. for one hour with stirring. The zeolite was then filtered from the solution and washed free from sulfate ions. The ammonium exchanged zeolite had the following analysis:

Chemical analysis, weight percent (D.B.):

| | |
|---|---|
| NH₄ | 4.67 |
| Na₂O | 3.04 |
| Al₂O₃ | 22.36 |
| SiO₃ | 74.09 |
| Unit cell size, A. | 24.69 |

A portion of the ammonium exchanged zeolite was heated at 600° C. (1112° F.), the temperature described in Patent No. 3,130,006 for 6 hours and is identified as Sample 5. Another portion of the ammonium exchanged zeolite was heated at 1500° F. for 2 hours and is idenified as Sample 6. The ammonium ion content, surface area and unit cell size of both samples were determined and found to be as follows:

| | Sample 5 | Sample 6 |
|---|---|---|
| Weight percent NH₄ (D.B.) | 0.01 | 0.04 |
| Surface area, m.²/g | 830 | 826 |
| Unit cell size, A | 24.59 | 24.45 |

These data show the samples are virtually identical in ammonium ion content (substantially complete ammonium ion removal) and surface area, and the unit cell size of the samples is substantially different.

Both samples were then subjected to the ammonium exchange test as follows:

(a) A 5 g. (D.B.) portion of the zeolite was mixed with a solution of 15 g. of ammonium sulfate and 300 g. of water at 100° C. for 30 minutes. The zeolite was filtered from the solution and fresh identical solution by the same sequence.

(b) The zeolite was filtered from the solution, washed free from sulfate ions, and dried at 700° F. for 2 hours.

(c) The dried zeolite was stored in a closed container for 24 hours.

(d) The stability of the zeolite was then determined by calcining respective portions of the sample at 1650° F. and 1700° F. for 2 hours, and measuring the surface areas of these portions.

12

The relative thermal stabilities of the samples are shown by the following surface areas as measured by the ammonium exchange test:

| | Sample 5 | Sample 6 |
|---|---|---|
| Surface area, m.²/g.: | | |
| After 1,650° F. calcination | 18 | 729 |
| After 1,700° F. calcination | 14 | 688 |

These data show the crystalline structure of Sample 5 which corresponds to the zeolite of the Rabo et al. Patent No. 3,130,006 heated at 600° C. was unstable as determined by the ammonium exchange test. The low surface area indicates the crystal structure was destroyed. In contrast, the zeolite of Sample 6 which corresponds to the claimed composition in the above-identified application was stable as measured by the ammonium exchange test.

EXAMPLE V

In this example, a sample of Z–14HS zeolite was base exchanged with ammonium sulfate solution by the procedure of Example I to an alkali metal content of 2.7 weight percent and calcined at 1400° F. After the ammonium exchange test, the sample had a surface area of 332 m.²/g. Since the calcination temperature of 1400° F. is the minimum value in the equation, $T=1238+60A$, this example demonstrates the operability of the process of this invention at these minimum temperatures.

EXAMPLE VI

This example illustrates both a method of preparing a Z–14HS zeolite, such as was used as the raw material in Example I, and also the degree of, or lack of, thermal stability of this material.

A solution was prepared to contain 90.6 grams of sodium hydroxide and 96.5 grams of water. A total of 52.0 grams of alumina trihydrate was dissolved in this solution. The solution was diluted with 195 grams of water. This solution was added to a paste made from 454 grams water and 219 grams of fine-sized silica having a particle size of 0.02 to 10 microns. The mixture was digested at 35° C. for 5 days and then refluxed at 100° C. for 2 days. The product was filtered and washed. The product displayed the same X-ray diffraction lines as was set forth with respect to Example I for the initial Z–14HS zeolite raw material. 162 grams of this material was reslurried with 625 grams of water containing 64.6 grams of ammonium chloride. The slurry was heated at 100° C. for 2 hours with stirring, filtered, and the exchange repeated twice more. The material was then filtered, washed thoroughly and dried. The chemical analysis of the product was as follows.

Table I.—Chemical analysis (in percent)

| | |
|---|---|
| Total volatiles | 18.22 |
| SiO₂ (dry basis) | 72.23 |
| Al₂O₃ (dry basis) | 22.61 |
| Na₂O (dry basis) | 3.14 |

One of the important improvements in the Z–14US product is the increased thermal and steam stability. The thermal and steam stability of this Z–14HS raw material was determined to furnish the basis for comparison of this material with the Z–14US product.

Thermal stability and steam stability were determined by calcining the material at various temperatures for varying periods of time, and the effect of this treatment on the surface area of the product was noted. The steam stability was determined by treating the material in the presence of steam at a designated temperature for a designated period of time. The results of these treatments are set out in Table II below.

Table II

| Physical properties after calcining for 3 hours: | surface area (m.²/g.) |
|---|---|
| At 1450° F. | 660 |
| At 1550° F. | 540 |
| At 1650° F. | 72 |

It is apparent from a review of these data that the Z–14HS product is thermally stable at temperatures up to 1550° F. When the product was calcined at 1650° F. for a period of 3 hours, the structure of the material collapses as evidenced by the loss in the surface area.

EXAMPLE VII

This example illustrates the preparation of Z–14US product by the first process of our improved, single, calcination process.

In this run, a total of 209.2 grams of Z–14HS as a wet cake containing about 50% water, prepared by the technique described in Example VI, was treated with the solution of 157.6 grams of ammonium sulfate and 621.6 grams of water. The ammonium sulfate solution was heated to a temperature of 90° C. and the exchange was carried out on a filter. An additional charge of ammonium sulfate was prepared using the same quantities of material as in the first exchange. The solution was heated to 100° C. and the zeolite was slurried with this solution for 3 hours while being maintained at a temperature of 100° C. After this exchange, the slurry was filtered, washed free of sulfate; dried and calcined for 2 hours at 1500° F. The sodium oxide content of the zeolite at this point was 2.68%. The second stage of the process was completed by taking a 30 gram portion of the zeolite and treating this zeolite with 90 grams of ammonium sulfate in 495 grams of water. The ammonium sulfate solution was heated to a temperature of 100° C. and slurried with the washed zeolite. The zeolite was then filtered and treated with another charge of the same salt solution in same concentration. The exchange again was carried at a temperature of 100° C. The zeolite was then washed free of sulfate and dried at 120° C. The chemical analysis of the product is as follows:

Table III.—Chemical analysis in percent (dry basis)

| | |
|---|---|
| $SiO_2$ | 74.48 |
| $Al_2O_3$ | 24.37 |
| $Na_2O$ | 0.24 |
| $NH_3$ | 2.45 |
| Total volatiles | 22.62 |

The unit cells measurements were made using Norelco X-ray diffractometer with a nickel-filtered copper K radiation. The instrument was operated with 40 kv. operating on a potential of 20 ma. The sample to be run was mixed with about 10% from a suitable inert internal standard and scanned from 45° two theta to about 50° two theta at a goniometer speed of ¼° per minute and a chart speed ½ per minute. The settings for the electronic circuit were as follows for the first diffraction line (sodium chloride):

| | |
|---|---|
| Scale factor | 8 |
| Scale multiplier | 1 |
| Time constant | 4 |

The remainder of the scan was obtained at:

| | |
|---|---|
| Scale factor | 4 |
| Scale multiplier | 1 |
| Time constant | 8 |

At no time during the scan was the goniometer drive or chart drive stopped. The observed and theoretical (from the National Bureau of Standards circulars) values for the internal standard were used to correct systematic errors in observed values for two theta.

The unit cell of this product was found to be less than 24.45 angstrom units.

The stability of the zeolite was measured by a comparison of the surface area of the material after calcination at certain temperatures. The surface area was measured using the well-known Brunauer-Emmett-Teller method (S. Brunauer, P. Emmett and E. Teller, J. Am. Chem. Soc. 60, 309 (1938)). The surface area of the product after calcination for two hours at 1500° F., was 860 square meters per gram. After calcination for 2 hours at 1725° F., the surface area was 365 square meters per gram.

The improvement in thermal stability in the U.S. product is apparent from a comparison of the data on the surface area after treatment at 1725° F. with the data presented in Table II. The Z–14HS product collapsed on treatment at 1650° F., whereas the Z–14US product retained a surface area of 365 square meters per gram after calcination at 1725° F.

EXAMPLE VIII

In this example, the Z–14US product was prepared, according to our improved process, on a large scale and the physical and chemical properties of the product were evaluated.

A 40 lb. charge of the Z–14HS product, prepared as set out in Example VI, was treated with a solution of 80 lb. of ammonium sulfate in 400 lb. of water. The exchange solution was heated to a temperature of 100° C. for one hour with stirring. After this exchange, the zeolite was filtered and washed in 50 lb. of water, containing 6 lb. of ammonium sulfate. The zeolite was then returned to another solution containing 80 lb. of ammonium sulfate in 400 lb. of water for a second exchange. A third exchange using the same quantities of ammonium sulfate and water was effected. The zeolite was then washed by reslurrying three times in water, filtered, dried and calcined for 2 hours at 1500° F.

At this point, the zeolite contained 2.08% $Na_2O$. The final exchange of this zeolite product was effected by mixing ten pounds of the zeolite with a solution containing 30 lb. of ammonium sulfate and 6½ lb. of water, at a temperature of 100° C. for one hour with stirring. The product was then filtered and washed free of sulfate. The product was dried and analyzed. The chemical analysis is set out in Table IV below:

Table IV.—Chemical analysis (in percent) (dry basis)

| | |
|---|---|
| $Na_2O$ | 0.2 |
| $SiO_2$ | 77.1 |
| $Al_2O_3$ | 21.2 |

The unit cell was measured using the same technique as set out in Example VII and found to be 24.44 angstrom units. The thermal stability of the product was determined by calcining the material at varying temperatures for a period of about 2 hours and determining the effect of this treatment on the surface area of the product. The surface area was determined using the same technique as described in Example VI. The data collected after the calcinations is set out in Table V below:

Table V

| Physical properties after calcining for 2 hours: | Surface area (m.²/g.) |
|---|---|
| At 1550° F. | 616 |
| At 1650° F. | 595 |
| At 1725° F. | 445 |

These data show the advantage of low sodium content as related to stability of the product. This product had a surface area of 445 square meters per gram after being calcined at 1725° F. for a period of 2 hours.

EXAMPLE IX

This example illustrates the alternate method of our improved process for preparing the Z–14US material, wherein the zeolite is exchanged with the concentrated ammonium solution.

In this run, 50 grams of the Z–14HS product in the sodium form is prepared in accordance with the method described in Example VI was heated to 100° C. for 1 hour in a 200 ml. quantity of 50% solution of ammonium sulfate. The zeolite was then filtered, washed and placed in a fresh 200 ml. solution of 50% ammonium sulfate for an additional 1 hour exchange at 100° C. The process was repeated for a total of five exchanges. The $Na_2O$ content following each of these exchanges is set out in Table VI below:

TABLE VI.—Sodium oxide content (in percent)

| | |
|---|---|
| Z–14HS raw material | 13 |
| After 1st exchange | 3.6 |
| After 2nd exchange | 2.1 |
| After 3rd exchange | 1.1 |
| After 4th exchange | 0.33 |
| After 5th exchange | 0.18 |

After the 5th exchange, the zeolite was boiled in 850 ml. of water for a period of 2 hours. The zeolite was filtered, dried and calcined for 2 hours at 1500° F. The thermal stability of the product was determined using the techniques described in Examples VI and VII. This data set out in Table VII below:

Table VII

| Physical properties after calcining 2 hours: | Surface area (m.²/g.) |
|---|---|
| At 1550° F. | 555 |
| At 1725° F. | 151 |

It is apparent from these data that this alternate method of preparing the product, the Z–14US material, gives satisfactory results. The surface area of this product was above 150 after calcination for 2 hours at 1725° F., indicating no collapse in the structure.

Obviously, many modifications and variations of the invention may be made without departing from the essence and scope thereof and only such limitations should be applied as are indicated in the appended claims.

We claim:
1. A stabilized synthetic crystalline faujasite zeolite having the composition expressed in terms of mole ratios of oxides as follows:

$$(xR_2O:yM_2O):Al_2O_3:3.5\text{-}7SiO_2:zH_2O)$$

where R is an alkali metal ion, $x$ is within the range of from about 0.1 to 0.3, where M is $H^+$, $y$ is within the range of from about 0 to 0.9, and $z$ is within the range of from 0 to 9, a unit cell size of from 24.40 to 24.55 A.; and a stable structure as indicated by the retention of a surface area greater than 150 m.²/g. as measured by the ammonium exchange test.

2. The compositon of claim 1 wherein $x$ is within the range of from 0.1 to 0.23.

3. The composition of claim 1 wherein $y$ is from 0 to 0.7.

4. A process for preparing the composition of claim 1 which comprises successively base exchanging a crystalline faujasite zeolite with a solution containing exchange cations selected from the group consisting of hydrogen ions and cations which decompose when heated to provide hydrogen ions, until the alkali metal content of the zeolite is reduced to within the range of from greater than 1 and up to about 4 weight percent, expressed as the oxide, and heating said exchanged zeolite to a temperature insufficient to destroy the crystal structure of the zeolite but about at least T as expressed by the equation $$T = 1238 + 60A$$

where T is temperature, ° F., and A is weight percent alkali metal expressed as the chemically equivalent weight of sodium oxide, the crystalline zeolite initially having the approximate formula in terms of oxides as follows:

$$R_2O:Al_2O_3:3.5\text{-}7SiO_2:yH_2O$$

where R is an alkali metal, and $y$ can be from 0 to 9.

5. The process according to claim 4 wherein the solution contains as the source of exchange cations, an ammonium compound selected from the group consisting of ammonium salts and ammonium hydroxide.

6. The process according to claim 4 wherein the exchange cations in the solution are present in excess of the stoichiometric quantity required, and the exchange is carried out for a period greater than 0.1 hour at a temperature of 25 to 150° C.

7. The process of claim 4 wherein the alkali metal content, expressed as the oxide, is reduced to within the range of from about 1.5 to 2.9 weight percent.

8. A process for preparing a synthetic utltrastable crystalline faujasite zeolite having an alkali metal content, expressed as the oxide, of less than 1 percent by weight, having the following composition expressed in the terms of the oxide mole ratio:

$$xM_{2/n}O:Al_2O_3:3.5\text{-}7SiO_2:yH_2O$$

where M is a cation selected from the group consisting of metal cations, ammonium cations, amine cations, hydogen cations and mixtures thereof, and $n$ is its valence, and wherein $x$ can vary from .1 to 1 and $y$ can have any value up to about 9; a unit cell size of from 24.40 to 24.55 A., and a stable structure as indicated by the retention of a surface area greater than 150 m.²/g. as measured by the ammonium exchange test, which comprises the steps of:
(a) Successively base exchanging the zeolite composition of claim 1 with solutions of a salt selected from the group consisting of ammonium salts, amine salts, yttrium and salts of rare earth metals, aluminum, platinum, the metals of Groups I–B, II–B, II–A and VIII of the periodic table and mixtures thereof until the alkali metal content of the zeolite composition is reduced to below about 1% by wt., expressed as the oxide,
(b) Recovering, washing, and drying said ultrastable crystalline faujasite zeolite.

9. The process of claim 8 wherein the salt of step (a) is selected from the group consisting of the salts of the rare earth metals and mixtures thereof.

10. A process for preparing a synthetic ultrastable crystalline zeolite having the composition expressed in terms of oxide mole ratios as follows:

$$xM_{2/n}O:Al_2O_3:3.5\text{-}7SiO_2:yH_2O$$

wherein M is a cation selected from the group consisting of metal cations, ammonium cations, amine cations, hydrogen cations and mixtures thereof and $n$ is its valence and wherein $x$ can vary from .1 to 1 and $y$ can have any value up to about 9, said ultrastable zeolite being further characterized by an alkali metal content, expressed as the oxide, of less than 1 percent by weight, and a cubic unit cell size of from 24.40 to 24.55 A., which comprises the steps of:
(a) Successively base exchanging a crystalline alkali metal faujasite zeolite having a silica to alumina mole ratio of about 3.5 to 7, with a solution of a salt selected from the group consisting of ammonium salts and amine salts until the alkali metal content, expressed as the oxide, is reduced to from greater than 1% by weight to about 4% by weight;
(b) Thermally stabilizing the zeolite by heating the exchanged zeolite of step (a) to a temperature insufficient to destroy the crystal structure of the zeolite but about at least T as expressed by the equation:

$$T = 1238 + 60A$$

where T is temperature, ° F., and A is the weight percent alkali metal, expressed as the chemically equivalent weight of sodium oxide, whereby the composition of claim 1 is produced;

(c) Cooling and successively base exchanging the stabilized zeolite composition of step (b) with solutions of a salt selected from the group consisting of ammonium salts, amine salts, salts of rare earth metals, aluminum, platinum, the metals of Groups I-B, II-B, II-A, and VIII of the periodic table and mixtures thereof, and (d) Recovering, washing and drying the zeolite product.

11. The process of claim 10 wherein the alkali metal faujasite zeolite is a sodium faujasite zeolite and wherein the heat treatment is carried out for a period of from 0.1 to 6 hours.

12. A process according to claim 10 wherein the salt used in each ion exchange solution of step (a) is selected from the group consisting of ammonium chloride, ammonium sulfate, tetraethyl ammonium chloride and tetraethyl ammonium sulfate.

13. The process according to claim 12 wherein the ion exchange solutions of step (a) are ammonium sulfate solutions having an ammonium sulfate concentration of about 3 to 50 weight percent.

14. The process of claim 10 wherein the salt of step (c) is selected from the group consisting of the salts of the rare earth metals and mixtures thereof.

15. A process for preparing a synthetic ultrastable crystalline zeolite having the composition in terms of oxides as follows:

$$xM_{2/n}O:Al_2O_3:3.5-7SiO_2:yH_2O$$

wherein M represents cations selected from the group consisting of alkali metal cations and H⁺ cations obtained by the thermal decomposition of cations selected from the group consisting of ammonium cations and amine cations and $n$ is its valence, $x$ may vary from 0 to 1 and $y$ may have any value up to about 9; an alkali metal content, expressed as the oxide, of less than 1% by weight; a cubic unit cell size of 24.2 to 24.45 A., which comprises ion exchange and stabilization by heat treatment, comprising the steps of:

(a) Successively base exchanging a crystalline faujasite zeolite with a solution of a salt selected from the group consisting of ammonium salts and amine salts in a concentration of at least 15 to 50 weight percent until the alkali metal content, expressed as the oxide, is reduced to less than 1% by weight and before the exchanged zeolite has been permitted to stand 24 hours in a dried condition;

(b) Washing, and stabilizing by heating the washed zeolite at a temperature of about 1300 to 1900° F. for a period of time sufficient to stabilize the structure; and (c) Cooling and recovering the product zeolite.

16. The process of claim 15 wherein the alkali metal faujasite zeolite is a sodium faujasite zeolite.

17. A process according to claim 15 wherein the salt is selected from the group consisting of ammonium chloride, ammonium sulfate, tetraethyl ammonium chloride and tetraethyl ammonium sulfate.

18. The process of claim 17 wherein the ion exchange solutions are ammonium sulfate solutions having an ammonium sulfate concentration of from 25 to 50% by weight.

References Cited

UNITED STATES PATENTS 3,130,006   4/1964   Rabo et al. _____ 23—111 X
3,140,251   7/1964   Plank et al. _____ 252—455 X
3,293,192  12/1966   Maher et al. _____ 23—111 X EDWARD J. MEROS, *Primary Examiner.*

U.S. Cl. X.R.
252—455